United States Patent
Lee et al.

(10) Patent No.: US 10,553,836 B2
(45) Date of Patent: Feb. 4, 2020

(54) RECHARGEABLE BATTERY AND RECHARGEABLE BATTERY MODULE USING THE SAME

(71) Applicant: Samsung SDI Co., Ltd., Yongin-si, Gyeonggi-do (KR)

(72) Inventors: Chi-Young Lee, Yongin-si (KR); Myung-Jae Jang, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 159 days.

(21) Appl. No.: 15/162,493

(22) Filed: May 23, 2016

(65) Prior Publication Data
US 2017/0018794 A1    Jan. 19, 2017

(30) Foreign Application Priority Data

Jul. 15, 2015    (KR) ........................ 10-2015-0100639

(51) Int. Cl.
*H01M 10/04*    (2006.01)
*H01M 10/02*    (2006.01)
(Continued)

(52) U.S. Cl.
CPC .......... *H01M 2/043* (2013.01); *H01M 2/0207* (2013.01); *H01M 2/0217* (2013.01);
(Continued)

(58) Field of Classification Search
CPC ........ H01M 2/043; H01M 2/30; H01M 2/206; H01M 2/1077; H01M 2/0473;
(Continued)

(56) References Cited

U.S. PATENT DOCUMENTS

| 7,766,673 B1 * | 8/2010 | Dumont ................. H01R 13/68 439/76.2 |
| 2007/0026739 A1 * | 2/2007 | Kim ...................... H01M 2/206 439/627 |

(Continued)

FOREIGN PATENT DOCUMENTS

| JP | 2012-182043 A | 9/2012 |
| KR | 10-2014-0140744 A | 12/2014 |

OTHER PUBLICATIONS

English translation of JP 2012-182043 A, published Sep. 20, 2012, Hashimoto et al.

*Primary Examiner* — Ula C Ruddock
*Assistant Examiner* — Matthew W Van Oudenaren
(74) *Attorney, Agent, or Firm* — Lewis Roca Rothgerber Christie LLP

(57) ABSTRACT

A rechargeable battery includes an electrode assembly including a first electrode and a second electrode; a case receiving the electrode assembly; a cap plate coupled to the case and defining a terminal hole; a first electrode terminal at the cap plate; a second electrode terminal at the cap plate; a first current collecting tab electrically connecting the electrode assembly to the first electrode terminal; and a second current collecting tab electrically connecting the electrode assembly to the second electrode terminal, wherein at least one of the first electrode terminal or the second electrode terminal protrudes outside the cap plate as a rivet terminal.

11 Claims, 7 Drawing Sheets

(51) Int. Cl.
  *H01M 2/02* (2006.01)
  *H01M 2/04* (2006.01)
  *H01M 2/12* (2006.01)
  *H01M 2/36* (2006.01)
  *H01M 2/20* (2006.01)
  *H01M 2/22* (2006.01)
  *H01M 2/10* (2006.01)
  *H01M 2/30* (2006.01)

(52) U.S. Cl.
  CPC ........ *H01M 2/0473* (2013.01); *H01M 2/1077* (2013.01); *H01M 2/202* (2013.01); *H01M 2/206* (2013.01); *H01M 2/22* (2013.01); *H01M 2/30* (2013.01)

(58) Field of Classification Search
  CPC .. H01M 2/0207; H01M 2/0217; H01M 2/202; H01M 2/22
  See application file for complete search history.

(56) References Cited

U.S. PATENT DOCUMENTS

| | | | |
|---|---|---|---|
| 2007/0141458 A1* | 6/2007 | Nagatani | H01M 2/204 429/158 |
| 2008/0063929 A1* | 3/2008 | Byun | H01M 2/202 429/121 |
| 2010/0216009 A1* | 8/2010 | Kim | H01M 2/202 429/160 |
| 2012/0058389 A1* | 3/2012 | Guen | H01M 2/0237 429/179 |
| 2012/0225348 A1* | 9/2012 | Kim | H01M 2/024 429/179 |
| 2012/0301748 A1* | 11/2012 | Choi | H01M 2/0486 429/7 |
| 2013/0122355 A1* | 5/2013 | Kim | H01M 2/027 429/179 |
| 2014/0356691 A1* | 12/2014 | Ahn | H01M 2/305 429/158 |

* cited by examiner

RECHARGEABLE BATTERY AND RECHARGEABLE BATTERY MODULE USING THE SAME

CROSS-REFERENCE TO RELATED APPLICATION

This application claims priority to, and the benefit of, Korean Patent Application No. 10-2015-0100639, filed in the Korean Intellectual Property Office on Jul. 15, 2015, the entire contents of which are incorporated herein by reference.

BACKGROUND

1. Field

One or more exemplary embodiments of the present invention relate to a rechargeable battery.

2. Description of the Related Art

Generally, a rechargeable battery differs from a primary battery in that the former is designed to be repeatedly charged and discharged, while the latter is not designed to be recharged. A low-capacity rechargeable battery is used in small portable electronic devices, such as mobile phones, notebook computers, and camcorders, while a high-capacity rechargeable battery is widely used as a power source for driving a motor of a hybrid vehicle.

As typical rechargeable batteries, there are a nickel-cadmium (Ni—Cd) battery, a nickel-metal hydride (Ni-MH) battery, a lithium (Li) battery, a lithium ion (Li-ion) battery, etc. Particularly, the lithium ion rechargeable battery has an operating voltage about thrice as high as that of the Ni—Cd battery or Ni-MH battery that is widely used as a power supply for electronic devices. In addition, the lithium ion rechargeable battery has been widely used because of high energy density per unit weight.

In the rechargeable battery, a lithium-based oxide has been used as a positive active material, and a carbon material has been used as a negative active material. Generally, batteries are classified into a liquid electrolyte battery and a polymer electrolyte battery depending on the type of electrolyte, and lithium batteries using a liquid electrolyte are called lithium ion batteries while batteries using a polymer electrolyte are called lithium polymer batteries.

Multiple rechargeable batteries are aligned along one direction to constitute a battery module. In the battery module, electrode terminals of adjacent ones of the rechargeable batteries are connected by a bus bar. However, to connect the bus bar to the electrode terminal, an additional terminal is required at the side of the end of the electrode terminal protruding outside the cap plate. That is, the electrode terminal is further installed with a plate terminal connected in the plate shape into the side of the end protruding outside the cap plate, and the plate terminal is welded in a state of contact in the bus bar.

Accordingly, to connect the electrode terminal and the bus bar, an additional part (or parts), such as the plate terminal and the electrode terminal, are required, and the manufacturing cost is increased accordingly.

The above information disclosed in this Background section is only for enhancement of understanding of the background of the described technology, and therefore may contain information that does not form the prior art.

SUMMARY

One or more exemplary embodiments of the present invention provide a rechargeable battery and a battery module using the same.

A rechargeable battery according to one or more exemplary embodiments of the present invention includes: an electrode assembly including a first electrode and a second electrode; a case receiving the electrode assembly; a cap plate coupled to the case and defining a terminal hole; a first electrode terminal at the cap plate; a second electrode terminal at the cap plate; a first current collecting tab electrically connecting the electrode assembly to the first electrode terminal; and a second current collecting tab electrically connecting the electrode assembly to the second electrode terminal. At least one of the first electrode terminal or the second electrode terminal protrudes outside the cap plate as a rivet terminal.

The first electrode terminal may pass through the terminal hole, and may include a first end electrically connected to the first current collecting tab, and a second end that protrudes outside the cap plate as the rivet terminal, and the second electrode terminal may be electrically connected to the cap plate, and may be located at an exterior of the cap plate.

The first electrode terminal may include an extension portion having a first end electrically connected to the first current collecting tab inside the case, and a second end passing through the terminal hole, and the rivet terminal may be electrically connected to the extension portion, and may be located at an exterior of the cap plate.

The rivet terminal may include a welding protrusion extending from the extension portion, and configured to be inserted into and welded to a bus bar; and a flange part at a side of the welding protrusion, and configured to be electrically connected with a surface of the bus bar.

The second electrode terminal may be integral with the cap plate.

A battery module according to one or more exemplary embodiments of the present invention includes: a plurality of rechargeable batteries arranged side by side along a direction such that side surfaces of adjacent ones of the rechargeable batteries from among the plurality of rechargeable batteries face each other, each of the rechargeable batteries including: an electrode assembly including a first electrode and a second electrode; a case receiving the electrode assembly; a cap plate coupled to the case and defining a terminal hole; a first electrode terminal at the cap plate; a second electrode terminal at the cap plate; a first current collecting tab electrically connecting the electrode assembly to the first electrode terminal; and a second current collecting tab electrically connecting the electrode assembly to the second electrode terminal; and a bus bar electrically connected to a pair of the adjacent ones of the rechargeable batteries. At least one of the first electrode terminal or the second electrode terminal protrudes outside of the cap plate as a rivet terminal and the bus bar has a first portion having a first height and a second portion having a second height.

The bus bar may have a bending portion between the first and second portions.

The bus bar may have a fuse portion between the first and second portions.

According to one or more exemplary embodiments of the present invention, the negative terminal may be connected (e.g., stably connected) by the welding protrusion and the flange part while being connected to the bus bar by forming the rivet terminal including the welding protrusion and the flange part outside the cap plate. Accordingly, while connecting the negative terminal and the bus bar, it is possible for the negative terminal to be directly connected to the bus bar by welding. As such, a separate part to connect the bus bar to the negative terminal is not needed.

DETAILED DESCRIPTION

Figure 1:
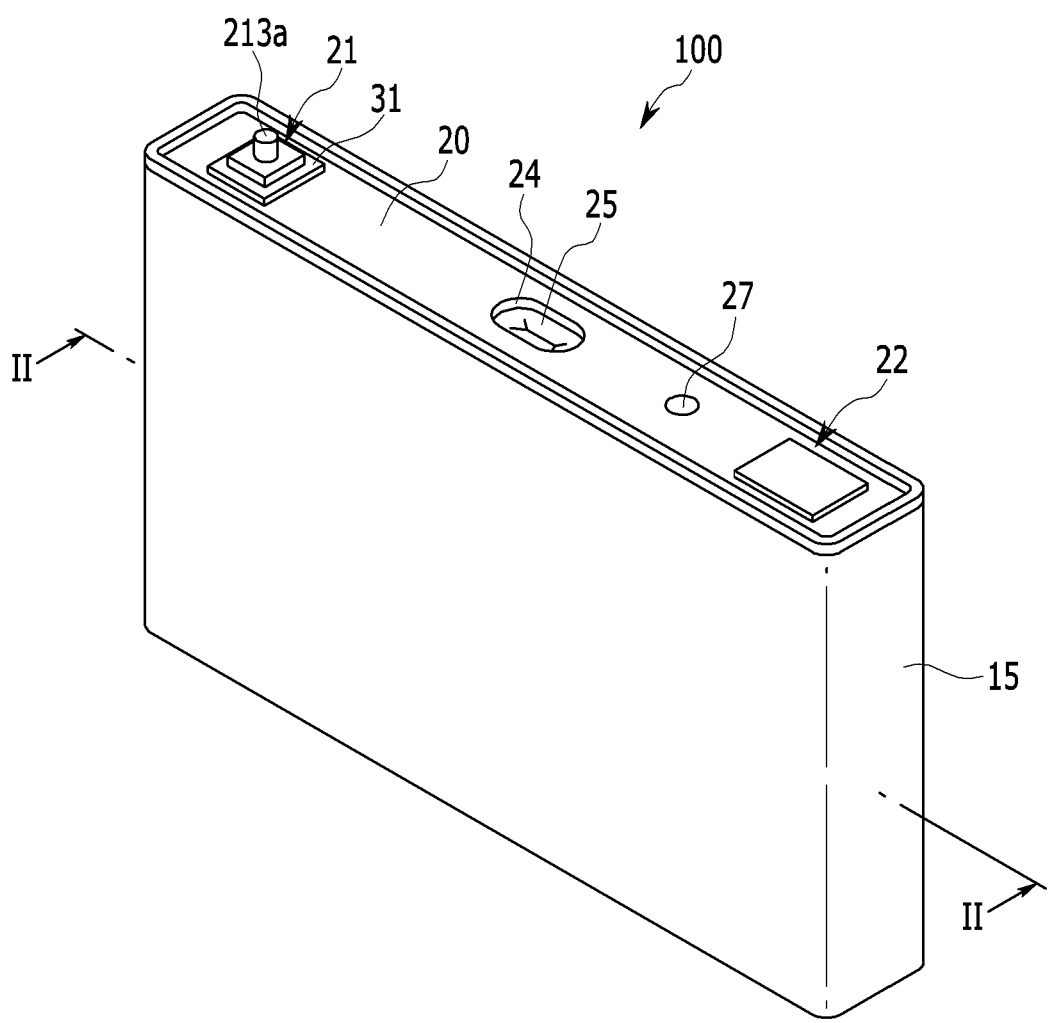
FIG. 1 is a schematic perspective view of a rechargeable battery according to one or more exemplary embodiments of the present invention.

Exemplary embodiments of the present invention are described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
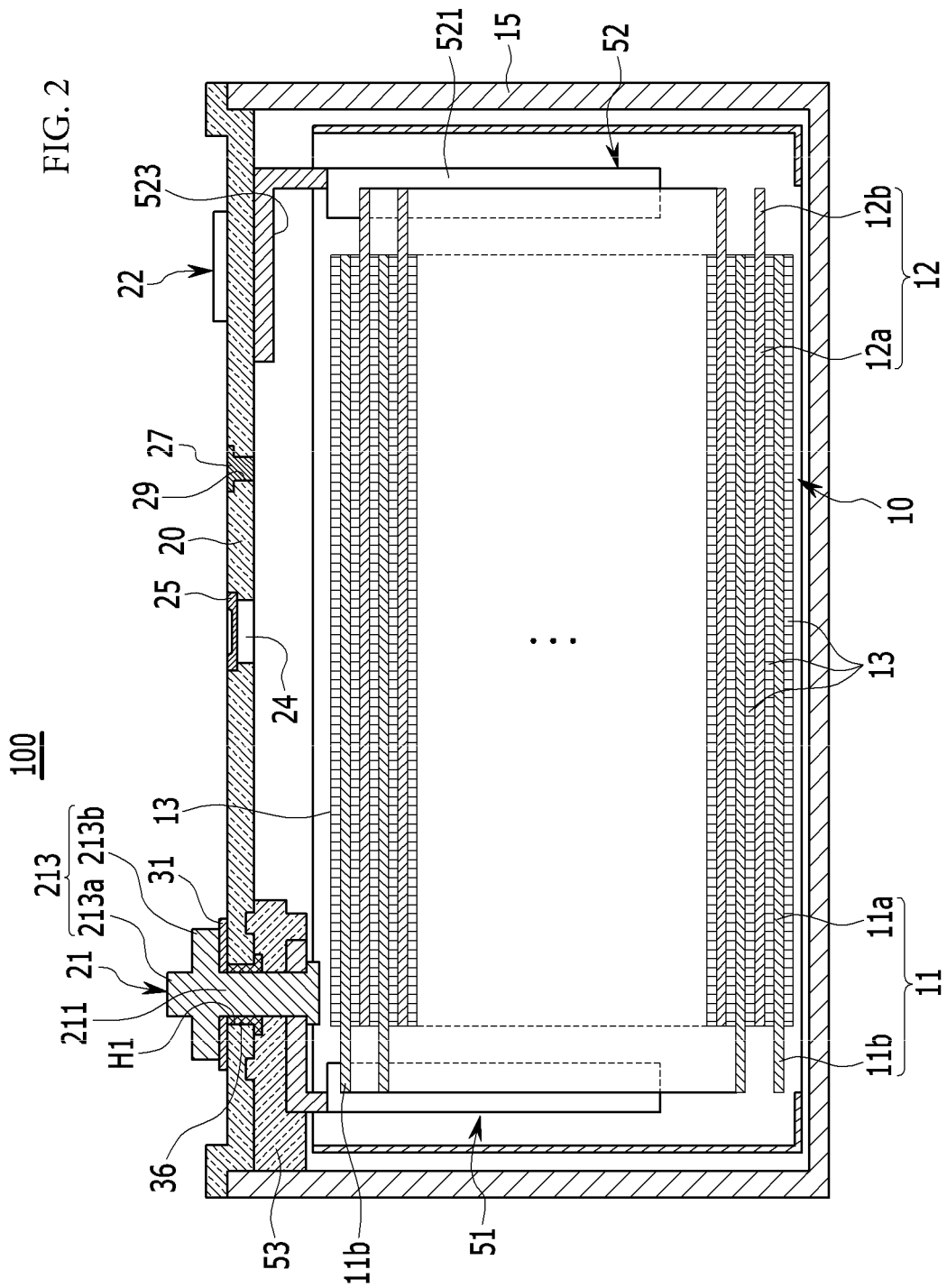
FIG. 2 is a cross-sectional view of the rechargeable battery of FIG. 1 taken along the line II-II of FIG. 1.

FIG. 1 is a schematic perspective view of a rechargeable battery according to one or more exemplary embodiments of the present invention, and FIG. 2 is a cross-sectional view of the rechargeable battery of FIG. 1 taken along the line II-II.

As shown in FIG. 1 and FIG. 2, a rechargeable battery 100 according to one or more exemplary embodiments of the present invention includes an electrode assembly 10 including a first electrode 11 and a second electrode 12, a case 15 for accommodating the electrode assembly 10, a cap plate 20 coupled to an opening of the case 15 and formed with a terminal hole H1, a first electrode terminal 21 and a second electrode terminal 22 installed at the cap plate 20, and a first current collecting tab (or lead tab) 51 and a second current collecting tab (or lead tab) 52 for respectively connecting the electrode assembly 10 to the first electrode terminal 21 and to the second electrode terminal 22.

For example, the electrode assembly 10 may be formed by placing the first electrode (also referred to herein as a "negative electrode") 11 and the second electrode (also referred to herein as a "positive electrode") 12 at opposite surfaces of a separator 13, which serves as an insulator, and by collectively spirally winding the negative electrode 11, the separator 13, and the positive electrode 12 in a jelly-roll state.

The negative and positive electrodes 11 and 12 respectively include coated regions 11a and 12a, where an active material is coated on a current collector made of a metal plate, and uncoated regions 11b and 12b as exposed current collectors, where an active material is not coated thereon.

The uncoated region 11b of the negative electrode 11 is formed at one end of the negative electrode 11 along the spiral-wound negative electrode 11. The uncoated region 12b of the positive electrode 12 is formed at one end of the positive electrode 12 along the spiral-wound positive electrode 12. Accordingly, the uncoated regions 11b and 12b are at respective ends of the electrode assembly 10.

For example, the case 15 may be substantially formed as a cuboid having a space for accommodating the electrode assembly 10 and an electrolyte solution, and the opening may be formed at one side of the cuboid. The opening allows the electrode assembly 10 to be inserted into the case 15.

The cap plate 20 may be installed in (or at) the opening of the case 15 to seal the case 15. For example, the case 15 and the cap plate 20 may both be made of aluminum, and may be welded to each other.

In addition, an electrolyte injection opening 29, a vent hole 24, and a terminal hole H1 may be provided in the cap plate 20. After the cap plate 20 is combined to the case 15, the electrolyte injection opening 29 allows the electrolyte solution to be injected into the case 15. After being injected with the electrolyte solution, the electrolyte injection opening 29 is sealed by a sealing cap 27. The vent hole 24 is normally covered with a vent plate 25, which are formed to exhaust internal gas when internal pressure of the rechargeable battery 100 exceeds a threshold pressure.

The first electrode terminal 21 and the second electrode terminal 22 are installed in (or at) the cap plate 20 and are electrically connected to the electrode assembly 10. In some embodiments, the first electrode terminal 21 is configured as a negative terminal, and the second electrode terminal 22 is configured as a positive terminal.

That is, the negative terminal 21 may be welded to the negative electrode 11 of the electrode assembly 10 to be connected (e.g., electrically connected) thereto, and the positive terminal 22 may be welded to the cap plate 20 to be connected (e.g., electrically connected) to the positive electrode 12 through the second current collecting tab 52.

In more detail, the negative terminal 21 passes through the terminal hole H1, and an end (e.g., a first end) of the negative terminal 21 is connected to the first current collecting tab 51, and an opposite end (e.g., a second end) may protrude outside the cap plate 20. A rivet terminal 213 may be formed in a portion of the negative terminal 21 that protrudes outside the cap plate 20, as described in more detail below.

In the negative terminal 21, the first end is connected to the first current collecting tab 51 inside the case 15, and the second end may include an extension portion 211 that passes through the terminal hole H1, and may include the rivet terminal 213, which is connected to the extension portion 211, and which protrudes outside the cap plate 20.

The extension portion 211 may have a long length with a cylindrical shape that extends from inside the case 15 to the outside the cap plate 20. However, the present invention is not limited thereto. For example, the extension portion 211 may have a polygonal shape.

The rivet terminal 213 may include a welding protrusion 213a that protrudes from the extension portion 211, and that is inserted into a bus bar 220 (see FIG. 5) to be welded to the bus bar 220, and may include a flange part 213b that protrudes to the side of the welding protrusion 213a, and that is connected (e.g., electrically connected) to a surface of the bus bar 220.

The welding protrusion 213a may protrude from the outside the cap plate 20 to the end of the extension 211. This welding protrusion 213a is inserted into (or coupled with) an insertion hole 223 of the bus bar, and is welded to the bus bar 220 (see FIG. 5). The welding protrusion 213a may have a protruded cylindrical shape or may have a protruded polygonal columnar shape. The flange part 213b may protrude from the side of the welding protrusion 213a.

The flange part 213b protrudes (or extends) from the side of the welding protrusion 213a, and may be electrically connected to the surface of the bus bar 220. The flange part 213b may have a plate shape and may protrude from the side of the welding protrusion 213a to be connected to the surface of the bus bar 220.

As described above, the negative terminal 21 may be connected (e.g., stably connected) by the welding protrusion 213a and the flange part 213b in the process of being connected to the bus bar 220 by forming the rivet terminal 213, which includes the welding protrusion 213a and the flange part 213b, outside the cap plate 20. Accordingly, while connecting the negative terminal 21 and the bus bar 220, the negative terminal 21 may be directly connected to the bus bar 220 via welding. As such, an additional part for connecting the bus bar 220 to the negative terminal 21 may be omitted.

A negative electrode gasket 36 may be installed between an inner surface of the terminal hole H1 of the cap plate 20 and the negative terminal 21, thereby sealing and electrically insulating the rivet terminal 213 of the negative terminal 21 from the cap plate 20.

The negative electrode gasket 36 is installed between the inner surface of the cap plate 20 (e.g., at the terminal hole H1), thereby also sealing and electrically insulating the flange 213b and the first current collecting tab 51 from the cap plate 20. That is, the negative electrode gasket 36 prevents (or reduces the likelihood of) the electrolyte solution from leaking through the terminal hole H1 by installing the negative terminal 21 in the cap plate 20.

The first and second current collecting tabs 51 and 52 respectively connect the electrode assembly 10 to the electrode terminals 21 and 22. In some embodiments, the first current collecting tab 51 is a negative electrode current collecting tab, and the second current collecting tab 52 is a positive current collecting tab.

The positive current collecting tab 52 has one side (e.g., a first side) that is electrically connected to the positive electrode 12, and another side (e.g., a second side) that is electrically connected to the cap plate 20, as described in more detail below.

The positive electrode current collecting tab 52 includes an electrode connecting portion 521 that is connected to the electrode assembly 10, and a terminal connecting portion 523 that is bent from the electrode connecting portion 521 to be connected to the cap plate 20.

The electrode connecting portion 521 is electrically coupled to the uncoated region of the electrode assembly 10. The terminal connecting portion 523 may be integrally formed with the electrode connecting portion 521 while it is bent.

The terminal connecting portion 523 may be connected to the electrode connecting portion 521, and may be bent to be parallel or substantially parallel to a surface of the cap plate 20. The terminal connecting portion 523 may be welded while being connected to the cap plate 20 inside of the case 15.

As described above, because the positive current collecting tab 52 is directly connected to the cap plate 20 (e.g., an underside, or interior side, of the cap plate 20), an additional terminal hole is not needed, thereby preventing (or reducing the likelihood of) the electrolyte solution from otherwise flowing or leaking out from the cap plate 20 at the positive current collecting tab 52. Additionally, a sealing member such as a gasket may be omitted along with the terminal hole, thereby lowering manufacturing costs.

Meanwhile, a lower insulating member 53 may be installed between the negative electrode current collecting tab 51 and the cap plate 20, thereby electrically insulating the negative electrode current collecting tab 51 and the cap plate 20. Also, one side of the lower insulating member 53 is coupled to the cap plate 20, and another side of the lower insulating member 53 encloses the negative electrode current collecting tab 51, the rivet terminal 213, and the flange part 213b, thereby stabilizing the connection structure thereof.

An upper insulating member 31 at the side of the negative terminal 21 (e.g., between the negative terminal 21 and an upper side of the case 15) electrically insulates the negative terminal 21 from the cap plate 20. The upper insulating member 31 is interposed between the negative terminal 21 and the cap plate 20, and is penetrated by the rivet terminal 213. Accordingly, by combining the upper insulating member 31 to an upper end of the rivet terminal 213, and by then caulking the upper end thereof, the upper insulating member 31 may be combined to the upper end of the rivet terminal 213.

Figure 3:
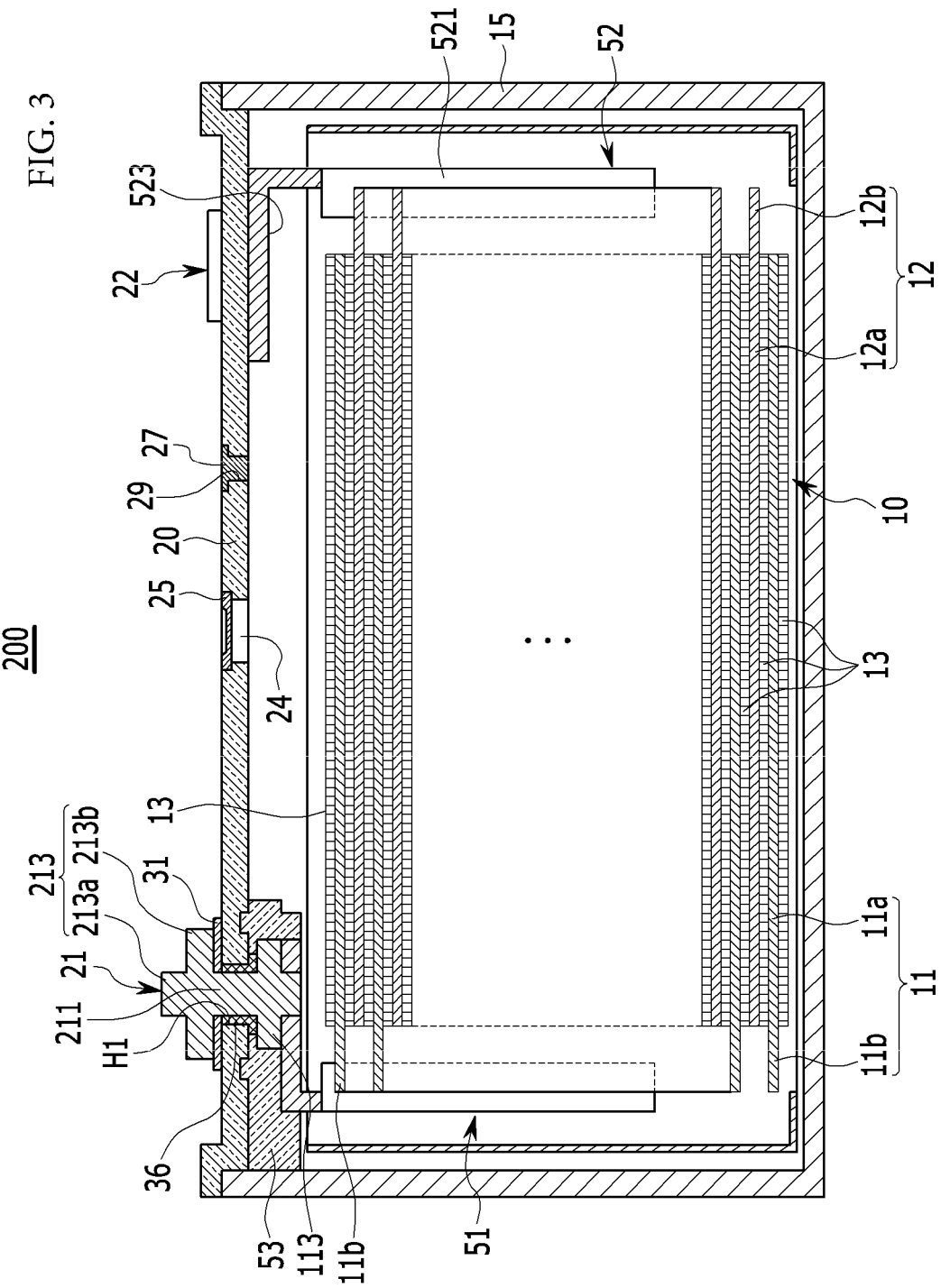
FIG. 3 is a schematic cross-sectional view of a rechargeable battery according to one or more exemplary embodiments of the present invention.

FIG. 3 is a cross-sectional view of a rechargeable battery according to one or more exemplary embodiments of the present invention. The same reference numerals as those used in FIG. 1 and FIG. 2 refer to the same or similar members having the same or similar functions. A repeated description of the same or similar members may be omitted hereafter.

As shown in FIG. 3, the negative terminal 21 of a rechargeable battery 200 according to one or more exemplary embodiments of the present invention includes an assistance rivet terminal 113 connected to the negative electrode current collecting tab 51 inside the case 15.

The assistance rivet terminal 113 may be electrically connected to the first current collecting tab 51 by welding when press-fitted inside the case 15. Accordingly, the connection of the first current collecting tab 51 to the negative terminal 21 may be further reinforced.

Figure 4:
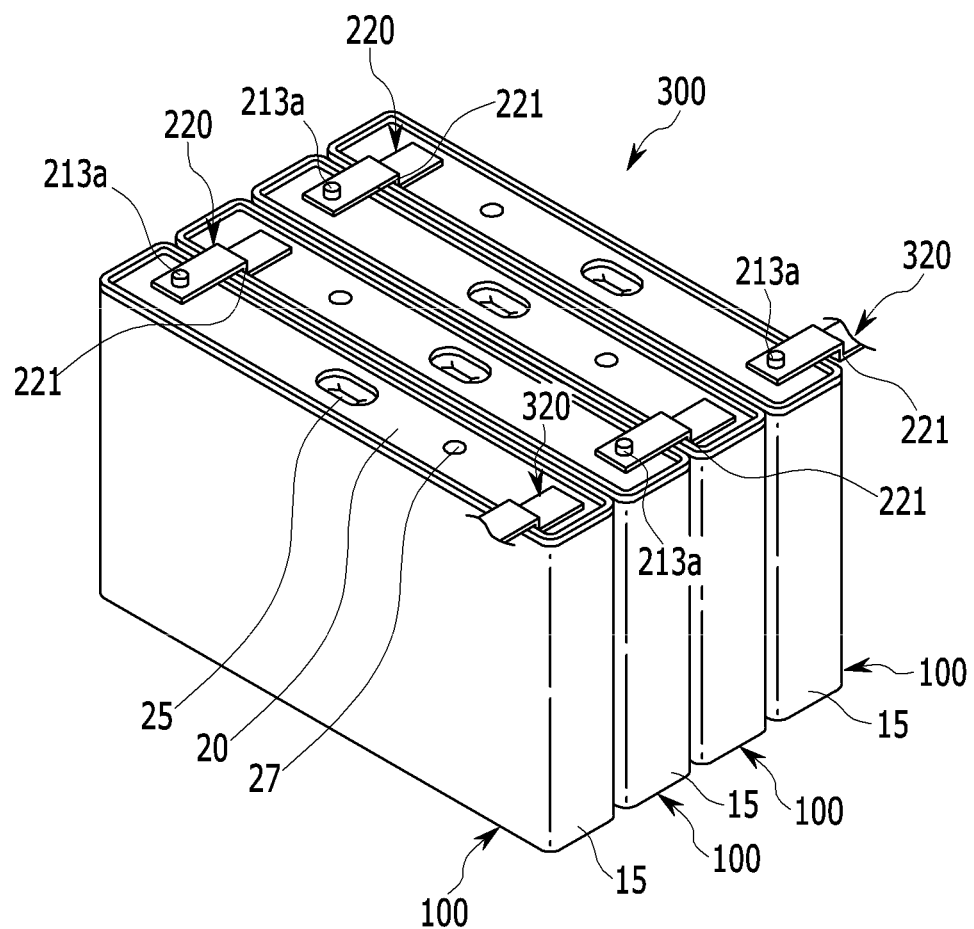
FIG. 4 is a schematic perspective view of a battery module according to one or more exemplary embodiments of the present invention.
Figure 5:
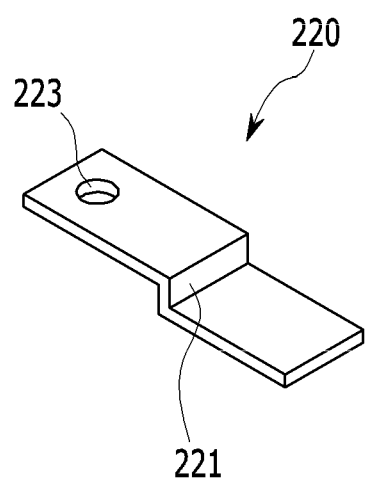
FIG. 5 is a schematic perspective view of a bus bar of the battery module of FIG. 4.

FIG. 4 is a schematic perspective view of a battery module according to one or more exemplary embodiments of the present invention, and FIG. 5 is a schematic perspective view of a bus bar that connects rechargeable batteries in the battery module of FIG. 4. The same reference numerals as those in FIGS. 1-3 refer to the same or similar members having the same or similar functions. A detailed description of the same or similar members may be omitted hereafter.

As shown in FIG. 4 and FIG. 5, the battery module 300 according to one or more exemplary embodiments of the present invention includes a plurality of the rechargeable batteries 100 that are arranged side by side along a direction such that side surfaces of the rechargeable batteries 100 face each other, and includes bus bars 220 respectively connected to adjacent rechargeable batteries 100, and electrically connecting the electrode terminals of adjacent rechargeable batteries 100.

The bus bars 220 may be connected between the rechargeable batteries 100, and may have a first portion having a first height and a second portion having a second height (e.g., a second height different from the first height) to accommodate a height difference between the first and second electrode terminals 21 and 22.

In more detail, the negative terminal 21 of the rechargeable battery 100 protrudes outside the cap plate 20 to form the rivet terminal 213. In some embodiments, the positive terminal 22 of the rechargeable battery 100 may be integral with, and protrude from, the cap plate 20. Accordingly, the negative terminal 21 and the positive terminal 22 of the rechargeable battery 100 may protrude outside the cap plate 20 at different heights.

Accordingly, the bus bar 220 may have the first portion having the first height and the second portion having the second height according to a difference in height of the negative terminal 21 and the positive terminal 22. As such, the bus bar 220 may stably connect the negative terminal 21 and the positive terminal 22 of the adjacent rechargeable batteries 100. Thus, a bending portion (e.g., step portion) 221 may be formed in the bus bar 220.

In the bending portion 221, a step may be formed between the first portion and the second portion to connect the rechargeable batteries 100 in the center portion of the length direction. Accordingly, it is possible to compensate for the height difference of the negative terminal 21 and the positive terminal 22 by the bending portion 221, thereby providing stable connection of the bus bar 220.

Figure 6:
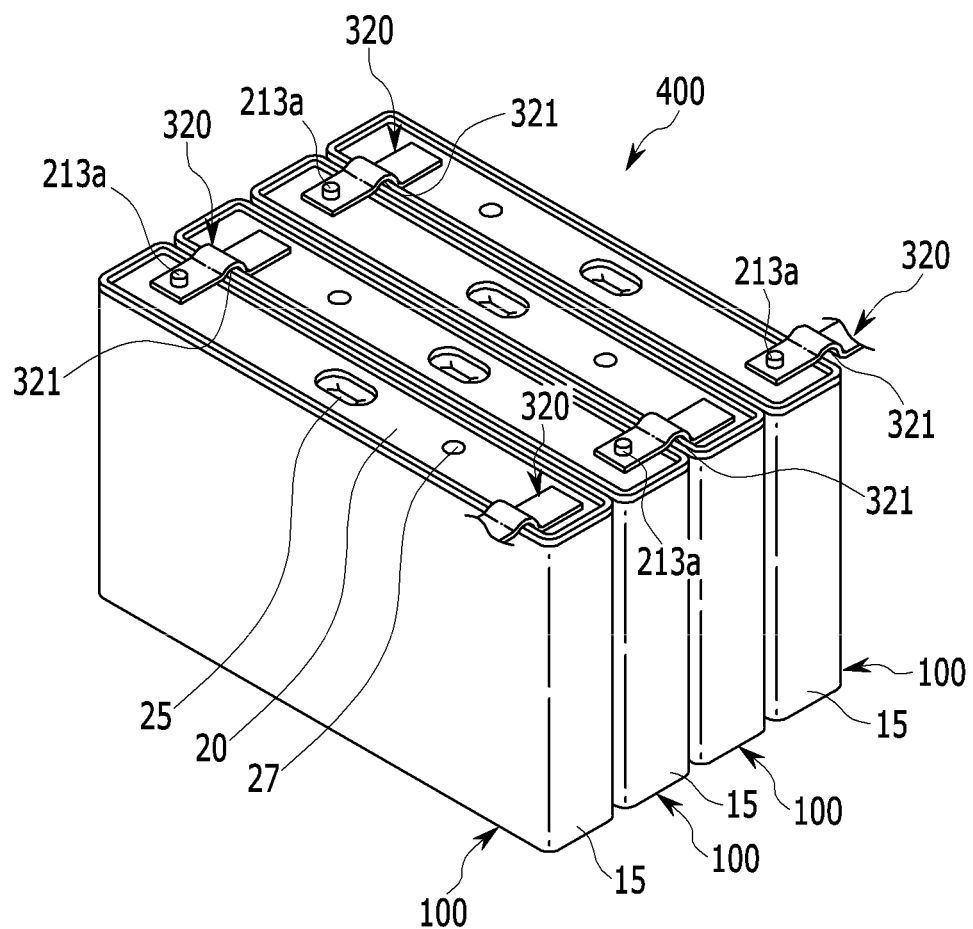
FIG. 6 is a schematic perspective view of a battery module according to one or more exemplary embodiments of the present invention.
Figure 7:
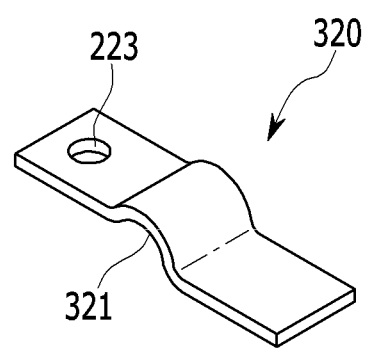
FIG. 7 is a schematic perspective view of a bus bar of the battery module of FIG. 6.

FIG. 6 is a schematic perspective view of a battery module according to one or more exemplary embodiments of the present invention, and FIG. 7 is a schematic perspective view of a bus bar that connects rechargeable batteries in the battery module of FIG. 6. The same reference numerals as those in FIGS. 1-5 refer to the same or similar members having the same or similar functions. A detailed description of the same or similar members may be omitted hereafter.

As shown in FIG. 6 and FIG. 7, the bus bar 320 of the battery module 400 according to one or more exemplary embodiments of the present invention may include a fuse portion 321, a first portion having a first height, and a second portion having a second height (e.g., a second height different from the first height).

The fuse portion 321 may connect the first portion and the second portion of the bus bar 320, which respectively contact the negative terminal 21 and the positive terminal 22 of adjacent rechargeable batteries 100, while accounting for the different heights of the negative terminal 21 and the positive terminal 22. In addition, the fuse portion 321 may be formed with a smaller thickness than the thickness of the first and second portions of the bus bar 320.

Accordingly, the fuse portion 321 can compensate for the height difference between the negative terminal 21 and the positive terminal 22, and can prevent the rechargeable batteries 100 from being damaged when flow of over-current occurs.

While this disclosure has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims and their equivalents.

| Description of some of the symbols | |
|---|---|
| 10 | electrode assembly |
| 11 | negative electrode |
| 11b | uncoated region |
| 12 | positive electrode |
| 12b | uncoated region |
| 15 | case |

-continued

| Description of some of the symbols | |
|---|---|
| 20 | cap plate |
| 21 | negative terminal |
| 22 | positive terminal |
| 24 | vent hole |
| 25 | vent plate |
| 27 | sealing cap |
| 29 | electrolyte injection opening |
| 51 | first current collecting tab |
| 52 | second current collecting tab |
| 113 | assistance rivet terminal |
| 211 | extension portion |
| 213 | rivet terminal |
| 213a | welding protrusion |
| 213b | flange part |
| 220, 320 | bus bar |
| 221 | bending portion |
| 321 | fuse portion |

What is claimed is:

1. A rechargeable battery comprising:
an electrode assembly comprising a first electrode and a second electrode;
a case receiving the electrode assembly;
a cap plate coupled to the case and defining a terminal hole;
a first electrode terminal at the cap plate;
a second electrode terminal at the cap plate;
a first current collecting tab electrically connecting the electrode assembly to the first electrode terminal; and
a second current collecting tab electrically connecting the electrode assembly to the second electrode terminal, the second current collecting tab comprising:
an electrode connecting portion connected to the electrode assembly; and
a terminal connecting portion connected to the electrode connecting portion and directly physically contacting the cap plate,
wherein the first electrode terminal protrudes outside the cap plate along a first direction and as a rivet terminal, the first direction being a thickness direction of the cap plate away from the electrode assembly, and
wherein a first distance from the cap plate and a portion of the first electrode terminal that is furthest from the cap plate along the first direction is different from a second distance between the cap plate and a portion of the second electrode terminal that is furthest from the cap plate along the first direction.

2. The rechargeable battery of claim 1, wherein the first electrode terminal passes through the terminal hole, and comprises a first end electrically connected to the first current collecting tab, and a second end that protrudes outside the cap plate as the rivet terminal, and
wherein the second electrode terminal is electrically connected to the cap plate, and is located at an exterior of the cap plate.

3. The rechargeable battery of claim 2, wherein the first electrode terminal comprises an extension portion having a first end electrically connected to the first current collecting tab inside the case, and a second end passing through the terminal hole, and
wherein the rivet terminal is electrically connected to the extension portion, and is located at the exterior of the cap plate.

4. The rechargeable battery of claim 3, wherein the rivet terminal comprises:
a welding protrusion extending from the extension portion; and
a flange part at a side of the welding protrusion.

5. The rechargeable battery of claim 2, wherein the second electrode terminal is integral with the cap plate.

6. A battery module comprising:
a plurality of rechargeable batteries arranged side by side along a direction such that side surfaces of adjacent ones of the rechargeable batteries from among the plurality of rechargeable batteries face each other, each of the rechargeable batteries comprising:
an electrode assembly comprising a first electrode and a second electrode;
a case receiving the electrode assembly;
a cap plate coupled to the case and defining a terminal hole;
a first electrode terminal at the cap plate;
a second electrode terminal at the cap plate;
a first current collecting tab electrically connecting the electrode assembly to the first electrode terminal; and
a second current collecting tab electrically connecting the electrode assembly to the second electrode terminal,
wherein a first distance from the cap plate and a portion of the first electrode terminal that is furthest from the cap plate along a first direction is different from a second distance between the cap plate and a portion of the second electrode terminal that is furthest from the cap plate along the first direction, the first direction being a thickness direction of the cap plate away from the electrode assembly; and
a bus bar electrically connected to a first battery and a second battery from among the plurality of rechargeable batteries, the first battery and the second battery being adjacent to each other,
wherein the first electrode terminal protrudes outside the cap plate along the first direction and as a rivet terminal,
wherein the bus bar has a first portion having a first height and a second portion having a second height, the first height being greater than the second height, and
wherein the first portion of the bus bar is connected to the first electrode terminal of the first battery and the second portion of the bus bar is connected to the second electrode terminal of the second battery.

7. The battery module of claim 6, wherein the bus bar has a bending portion between the first and second portions.

8. The battery module of claim 6, wherein the bus bar has a fuse portion between the first and second portions.

9. The battery module of claim 6, wherein the first portion of the bus bar has a through-hole and the second portion of the bus bar in its entirety has a plate shape.

10. The rechargeable battery of claim 1, wherein the second electrode terminal in its entirety has a plate shape.

11. The rechargeable battery of claim 10, wherein a lower surface of the second electrode in its entirety directly physically contacts the cap plate.

* * * * *